Patented May 31, 1949

2,471,597

UNITED STATES PATENT OFFICE 2,471,597

PROCESS FOR SOLVENT EXTRACTION OF PENICILLIN CULTURE LIQUORS

Claude A. Wilkerson, Terre Haute, Ind., assignor to Commercial Solvents Corporation, Terre Haute, Ind., a corporation of Maryland No Drawing. Application July 15, 1946, Serial No. 683,771

9 Claims. (Cl. 195—2)

This invention relates to the recovery of penicillin from aqueous penicillin-containing culture liquors, and more particularly to a process wherein such recovery is carried out by extraction of the liquors with water-immiscible organic solvents. My invention relates still more particularly to a method for preventing the formation of stable emulsions between the organic solvents and the penicillin-containing culture liquors in such extractions by a treatment of the culture liquors with proteolytic enzymes prior to the solvent extraction process, as hereinafter described.

In the preparation of the antibiotic material penicillin by the propagation of molds such as *Penicillium notatum*, *Penicillium chrysogenum*, and the like, on nutrient media, the valuable penicillin material is formed in relatively very minute quantities in the culture liquor, and must be removed and recovered by a series of relatively complicated extraction steps prior to its use in therapeutic applications.

One of the proposed procedures for recovering the active penicillin material from the aqueous culture liquors in which it is formed was to extract it by means of organic solvents, in which it was found to be soluble under acid conditions. All such liquid-liquid extractions, however, proved to be unsatisfactory, largely because of the tendency of the culture liquor to emulsify with the organic solvent to form emulsions which could not be broken by ordinary means, such as by centrifugation, even though the culture liquor was first filtered or otherwise clarified to remove the mycelial growth and the major proportion of suspended solids.

In a co-pending application, Serial No. 683,773, filed July 15, 1946, a process is described wherein penicillin culture liquors are heat treated, preferably at temperatures between about 50 and 70° C. for a period of around two hours in order to inactivate or destroy the substance or substances within the liquors which tend to produce emulsification of organic penicillin solvents with the culture liquors when extraction is attempted. The method described in the foregoing application is very effective in processing culture liquors prepared with certain strains of penicillin-producing organisms, such as the so-called X-1612 and the Q-176 cultures of *Penicillium notatum*. However, in processing certain other culture liquors, such as those produced by the so-called Minnesota cultures R13-9ss 152 and R13-9ss 252, simple heat-treatment, while operative, does not give entirely satisfactory results, owing to the necessity for using excessively high temperatures and excessively long heating periods, both of which tend to produce destruction of penicillin to an objectionable extent.

I have now found that solvent extraction of clarified penicillin culture liquors may be readily carried out, without difficulties from emulsion formation, if the clarified culture liquor is first treated with proteolytic enzymes before extraction, as hereinafter described.

In carrying out my invention, the pericillin-containing culture liquor or broth is first treated according to known procedures to remove the mycelial growth and a large proportion of the suspended solids, for example, by filtration or centrifugation. The pH of the clarified liquor is then adjusted as desired, a small proportion of enzyme is added to the clarified liquor, and the liquor is heated for a period and at a temperature sufficient to destroy, or to inactivate, the so-called emulsifiers, that is, the emulsion-forming or emulsion-stabilizing constituents of the culture liquor, whatever they may be. A temperature of about 35 to about 70° C. and a heating period between about ten minutes and four hours, and preferably of about two hours duration, has been found satisfactory. After treatment, the treated liquor may be cooled to room temperature or somewhat below; or it may be further processed without being cooled. The treated liquor is acidified to pH preferably between about 2 and 4 to release the penicillin acid, and is then subjected to liquid-liquid extraction in suitable apparatus, such as a conventional column extraction unit or a Podbielniak centrifugal extractor.

For use in my process, I have found proteolytic enzymes as a class to be operative. As specific examples of such enzymes may be cited pepsin, rennin, trypsin, chymotrypsin, carboxypeptidase, prolinase, erepsin, papain, ficin, solanain, and cathepsin.

The concentration of enzyme required to render the liquor free from emulsifying tendencies is extremely small, of the order of thousandths of a percent based on the weight of the clarified liquor; and as little as 0.001% on the basis given is sufficient in most cases completely to eliminate emulsification of the culture liquor during liquid extraction of the penicillin therefrom by organic solvents.

In practicing my invention, I prefer to carry out the enzyme-treatment of penicillin culture liquors at a pH within the range of about 5 to 8, owing to the instability of penicillin at elevated temperatures when exposed to pH conditions outside of the specified range. It will be obvious, therefore, that certain proteolytic enzymes will be preferable in my process, owing to their greater activity within the preferred pH range. In the following table, the approximate pH range for optimum activity of a typical group of proteolytic enzymes is listed:

| Proteolytic Enzyme | Approximate Optimum pH Range |
| --- | --- |
| Pepsin | 1.0–4.5 |
| Cathepsin | 3.5–5 |
| Carboxypeptidase | 4 –5 |
| Ficin | 4 –9 |
| Rennin | 5 –6.5 |
| Prolinase | 6 –8 |
| Chymotrypsin | 6 –8 |
| Solanain | 7 –7.5 |
| Trypsin | 7 –9.5 |
| Erepsin | 7.7–8.6 |
| Papain | 8 –9.5 |

In connection with the foregoing, it is emphasized that my process, wherein penicillin culture liquors are treated to prevent emulsification when extracted with penicillin-acid solvents, is operative outside of the preferred pH range of about 5 to 8; but I do not ordinarily choose to operate outside of the preferred range owing to the loss of penicillin normally incurred thereby.

In carrying out my process, the penicillin culture liquor is heated in the presence of proteolytic enzymes at the temperatures specified until the emulsion-forming and/or emulsion-stabilizing constituents of the culture liquors have been destroyed, between about ten minutes and four hours ordinarily being sufficient for this purpose. Higher temperatures may be used for somewhat shorter treatment times; but if they are used, extreme care should be exercised not to prolong the treatment unduly, since penicillin is extremely labile at high temperatures, and serious losses of activity may occur; moreover, the enzymes themselves are destroyed at these higher temperatures. For these reasons, I prefer to employ a lower temperature, for example, in the neighborhood of 50° C., and to maintain the temperature at this level for approximately a two-hour period.

Solvents suitable for use in the extraction of clarified penicillin culture liquors treated in accordance with my invention may be any of the organic water-immiscible solvents for penicillin acid known or used in the extraction of penicillin from its aqueous solutions. These include such solvents for penicillin acid as amyl acetate, butyl acetate, isopropyl acetate, chloroform, and isobutyl methyl ketone.

The following specific examples will further illustrate my invention:

EXAMPLE I

Two hundred gallons (1760 lb.) of clarified penicillin-containing culture liquor produced by Minnesota culture R12–9ss 252, having a pH of 7.4, and assaying 52 Oxford units of penicillin per milliliter (total, 4.15 million units) were heated to 50° C., 7 grams of trypsin were added, and the temperature was maintained at approximately 50° C. for two hours. The liquor was then cooled to 25° C., acidified to pH 2.0 with phosphoric acid, and then fed to one inlet of a Podbielniak centrifugal extractor at a rate of 1.5 gallon per minute while amyl acetate was simultaneously fed to the other inlet at a rate of about 0.25 gallon per minute, until all the culture liquor has been put through, and a total of 36 gallons of amyl acetate had been fed in. The amyl acetate, now containing the penicillin, and the spent culture liquor were discharged separately. The amyl acetate portion weighed 261.5 pounds and assayed 263 Oxford units per milliliter, a total of 3.74 million units, corresponding to a recovery of 90% of the original penicillin. No emulsification was experienced throughout the run, and separation of culture liquor and amyl acetate was complete.

When a similar culture liquor, the same in all respects except that it was not heated with trypsin, was similarly fed to the Podbielniak extractor for extraction with amyl acetate, no separation of the two phases occurred; instead, a stable emulsion of culture liquor and amyl acetate was discharged from the exit ports.

EXAMPLE II

A series of seven runs were made in which clarified penicillin culture liquor produced by Minnesota cultures R13–9ss–152 and R13–9ss–252 was digested with .001% trypsin at 50° C. for two hours and then extracted with amyl acetate in the Podbielniak extractor as described in Example I, except that the culture liquor was not cooled appreciably before extraction. No emulsification occurred in any of the runs, clean and complete separation taking place under the conditions and with the results given in the table below.

A portion of the same culture liquor which was not enzyme-treated was converted into a stable emulsion when an attempt was made to run it through the Podbielniak machine with amyl acetate.

*Table I*

| Run No. | Culture Liquor | | | | Assay of Extract | Penicillin Recovery |
| --- | --- | --- | --- | --- | --- | --- |
| | Assay | Rate | Total Volume | Ratio to Solvent | | |
| | units/ml. | gal./hr. | gal. | | units/ml. | Percent |
| 1 | 84 | 60 | 190 | 6:1 | 305 | 86.5 |
| 2 | 44 | 60 | 280 | 6:1 | 193 | 76.3 |
| 3 | 56 | 60 | 220 | 6:1 | 219 | 76.5 |
| 4 | 43 | 60 | 180 | 6:1 | 144 | 61.6 |
| 5 | 83 | 60 | 210 | 6:1 | 309 | 69.0 |
| 6 | 69 | 60 | 255 | 6:1 | 312 | 62.6 |
| 7 | 79 | 60 | 150 | 6:1 | 372 | 66.0 |

EXAMPLE III

Thirty-four gallons of filtered penicillin beer produced by culture X–1612 and 124 units per milliliter were heated at 50° C. for two hours with 0.001% of trypsin. The beer was then cooled to around 50° C., acidified to pH 2.0, and fed at a rate of five gallons per minute into a Podbielniak centrifugal extractor as described in Example I. Simultaneously, butyl acetate was fed into the extractor in the ratio of one part of butyl acetate for each eight parts of beer, by volume. During the extraction, the pressure at the outlet ports was maintained at 45 pounds per square inch, gage. The butyl acetate extract assayed 970 units per milliliter, corresponding to a recovery of 96.5% of the penicillin originally present in the beer.

EXAMPLE IV

Penicillin beer produced by culture X-1612 and assaying 612 units per milliliter was heated two hours at 50° C. with 0.001% trypsin, and was subsequently cooled, acidified to pH 2.0, and sprayed downward into a four-inch stainless-steel column, approximately 20 feet long, at a rate of 1.0 gallon per minute, while amyl acetate was passed upward through the column at a rate of 0.25 gallon per minute. No emulsification occurred. The amyl acetate extract assayed 57 units per milliliter, corresponding to a recovery of only 24.8% of the penicillin originally present in the beer, owing primarily to the fact that the extraction column was too short for adequate contact between the solvent and the beer.

A quantity of a similar beer, identical in all respects to the foregoing except that it was not heated with trypsin, emulsified badly when an effort was made to extract it with amyl acetate in the column described above.

EXAMPLE V

A series of small-scale tests was carried out in order to illustrate the effect of various proteolytic enzymes in preventing emulsion-formation during the extraction of penicillin beers. Samples of X-1612 beer were heated with 0.001% of various proteolytic enzymes for two hours at 50° C., and other samples were treated similarly at 65° C. The samples were cooled, acidified to pH 2.0, shaken vigorously for one minute with an equal volume of amyl acetate, and subsequently examined to determine the rapidity with which the layers separated. It was observed that pepsin, papain, and erepsin were substantially as good as trypsin in producing rapid separation of the solvent from the beer, whereas a sample of untreated beer formed a stable emulsion with the amyl acetate.

While the above describes the preferred embodiments of my invention, it will be understood that departures may be made therefrom within the scope of the specification and claims. In general it may be said that any modifications or equivalents that would ordinarily occur to those skilled in the art are to be considered as lying within the scope of my invention.

In accordance with the foregoing specification, I claim as my invention:

1. In a process for the solvent extraction of penicillin from aqueous penicillin-containing culture liquors from which the mycelial growth and the major portion of suspended solids have been removed with organic water-immiscible solvents, the method for preventing the formation of emulsions between the said culture liquors and the said solvents which comprises adding to said culture liquors a proteolytic enzyme in an amount of the order of a few thousandths of a per cent based on the weight of said culture liquors, and heating said culture liquors at a temperature between about 35 and 70° C. for a period of about two hours to inactivate emulsifiers present in the liquors, and then subjecting said culture liquors to solvent extraction with an organic water-immiscible solvent for penicillin.

2. In a process for the solvent extraction of penicillin from aqueous penicillin-containing culture liquors from which the mycelial growth and the major portion of suspended solids have been removed with organic water-immiscible solvents, the method for preventing the formation of emulsions between the said culture liquors and the said solvents which comprises adding to said culture liquors a proteolytic enzyme in an amount of the order of a few thousandths of a per cent based on the weight of said culture liquors, and heating said culture liquors at a temperature between about 35 and 70° C. for a period of between about ten minutes and four hours, and then subjecting said culture liquors to solvent extraction with an organic water-immiscible solvent for penicillin.

3. In a process for the solvent extraction of penicillin from aqueous penicillin-containing culture liquors from which the mycelial growth and the major portion of suspended solids have been removed with organic water-immiscible solvents, the method for preventing the formation of emulsions between the said culture liquors and the said solvents which comprises adjusting the pH of the culture liquors to between about 5 and 8, adding to said culture liquors a proteolytic enzyme in an amount of the order of a few thousandths of a per cent based on the weight of said culture liquors, and heating said culture liquors at a temperature between about 35 and 70° C. for a period of about two hours, and then subjecting said culture liquors to solvent extraction with an organic water-immiscible solvent for penicillin.

4. The process of claim 3 in which the proteolytic enzyme is erepsin.

5. The process of claim 3 in which the proteolytic enzyme is trypsin.

6. The process of claim 3 in which the proteolytic enzyme is rennin.

7. The process of claim 3 in which the organic water-immiscible solvent is butyl acetate.

8. The process of claim 3 in which the organic water-immiscible solvent is isobutyl methyl ketone.

9. The process of claim 3 in which the organic water-immiscible solvent is chloroform.

CLAUDE A. WILKERSON.

REFERENCES CITED

The following references are of record in the file of this patent:

UNITED STATES PATENTS

| Number | Name | Date |
| --- | --- | --- |
| 2,110,613 | Swenson | Mar. 8, 1938 |
| 2,343,136 | Dobson et al. | Feb. 29, 1944 |
| 2,424,832 | Koerber | July 29, 1947 |

Certificate of Correction

Patent No. 2,471,597 — May 31, 1949

CLAUDE A. WILKERSON

It is hereby certified that error appears in the printed specification of the above numbered patent requiring correction as follows:

Column 4, line 1, Example 1, for "R12-9ss" read *R13-9ss*;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*